3,038,551
SELF-DAMPING MATERIAL AND SONAR DOME FORMED THEREFROM
John Harvey McCoy, Huntington, and Walter H. Greenberg, Syosset, N.Y., assignors to Riverside Plastics Corporation, Hicksville, N.Y., a corporation of New York
Filed Oct. 15, 1959, Ser. No. 846,663
10 Claims. (Cl. 181—.5)

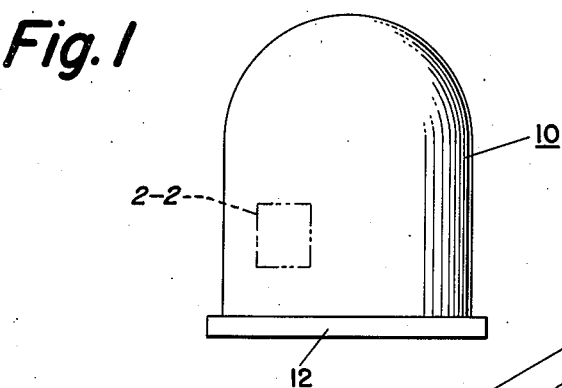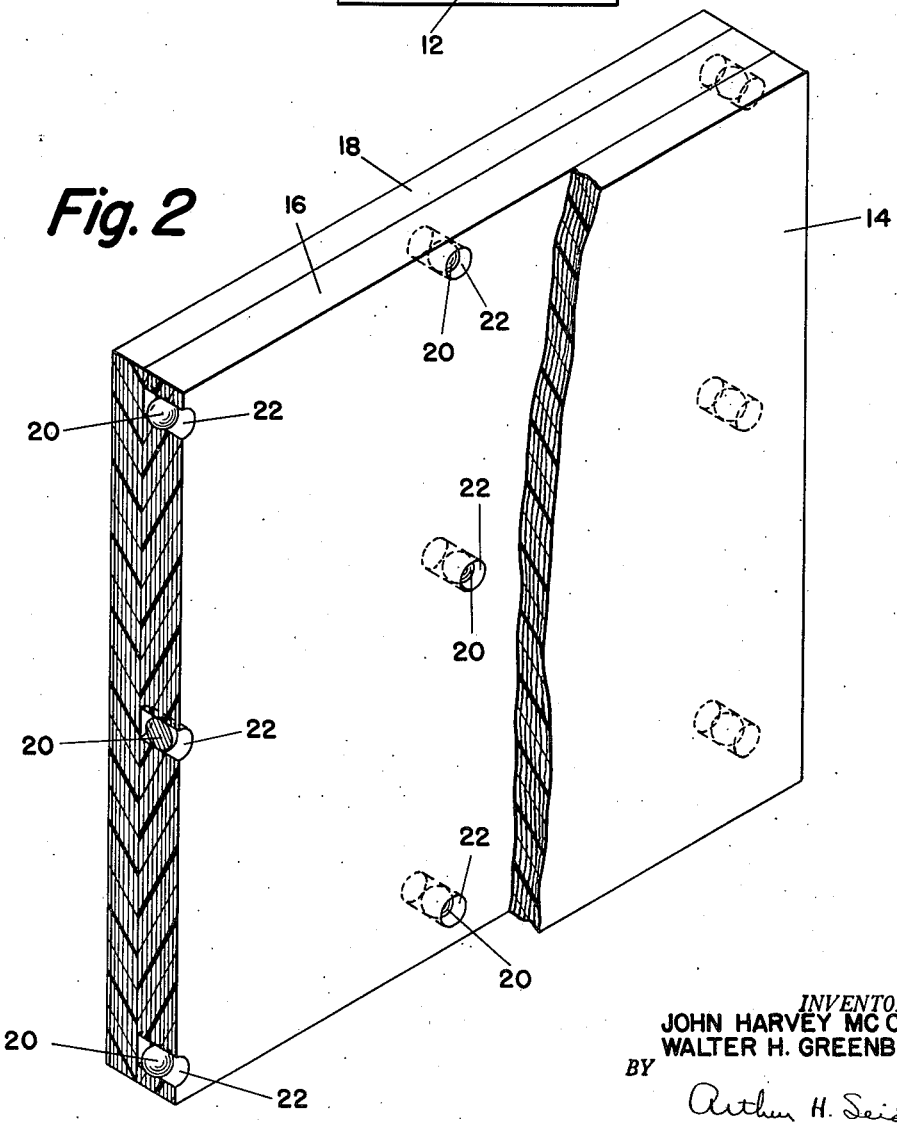

The present invention is directed to a self-damping material and sonar dome formed therefrom, and more particularly to a self-damping material having excellent strength and self-damping properties, and having utility in the manufacture of sonar domes, the trailing edges of the wings of jet aircraft, and the like, and to sonar domes formed from such self-damping material, which sonar domes possess excellent acoustic impedance characteristics to water.

The requirements for sonar domes and windows have changed with the advent of higher speed vessels and more efficient sonar equipment. The higher underwater speeds have caused a self-noise problem which tends to limit sonar performance. Thus, locally generated noise may drastically affect sonar performance, since detection of the signal over the background noise may be rendered exceedingly difficult.

In addition to sonar domes there are numerous other constructions which require self-damping materials having excellent self-damping properties and excellent physical strength characteristics.

This invention has as an object the provision of a self-damping material which possesses superior self-damping characteristics, and which possesses good strength characteristics.

This invention has as another object the provision of a sonar dome, and by sonar dome as used herein is meant sonar domes and/or windows in their broadest sense in all sizes and all types, which will effect rapid decay of induced shear waves.

This invention has as a still further object the provision of a sonar dome whose signal transmission capabilities to self-noise ratio is drastically improved over contemporary sonar domes.

This invention has as a still further object the provision of a sonar dome having good structural strength characteristics.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a diagrammatic view of a sonar dome of the present invention.

FIGURE 2 is a perspective view, partly in section, through the portion of the sonar dome indicated as 2—2 in FIGURE 1, revealing the construction of the self-damping material of the present invention.

Referring to the drawings, the sonar dome 10 of the present invention may have any desired shape or form, as may be employed for sonar domes and windows. Thus, the present invention does not lie in a particular shape or form for the sonar dome, but in the sonar dome being formed from a particular material as will be more fully described below.

Thus, a sonar dome of the present invention, as shown in FIGURE 1, may be generally of suitable hydrodynamic shape and typically secured to the hull 12 of the vessel on which the sonar dome 10 is mounted by conventional means. The interior of the sonar dome 10 is flooded with water, as is well known to those having skill in the art, and contains the transducer array.

Referring particularly to FIGURE 2, the sonar dome is formed by three laminated reinforced plastic layers 14, 16, and 18.

The outer layers or plies 14 and 18 are preferably acoustically identical in section. The center layer or ply 16 is likewise formed from reinforced plastic, and may be either acoustically identical in section to the outer layers 14 and 18, or may be a relatively visco-elastic damping material when compared with the outer layers 14 and 18. Thus, the center layer 16 may be as stiff as outer layers 14 and 18 or relatively visco-elastic in respect thereto. However, in the latter case the middle layer 16 should still be stiff enough so that the entire structure of the sonar dome of which the material shown in FIGURE 2 is formed partakes of the same flexural motion. Stated differently, the thicknesses of all layers of the composite of the three layers should be small compared to the shortest wavelengths of any type of vibration within each layer. Specifically, the wavelength of shear waves in the middle or center layer 16 must be large compared to the thickness of the middle layer 16.

The mass of the middle layer 16 is relatively high compared to that of the outer layers 14 and 18. Thus, the mass of the middle layer 16 may be increased up to the point at which the same interferes with the transmission of signals (compression forces) through the material. Upon each doubling of the mass of the middle layer 16, the velocity of the shear wave, which is effectively a standing wave which traverses the sonar dome structure is reduced by fifty percent.

The increase in mass of the middle layer 16 is accomplished by the insertion therein of a regulated pattern of particles of high density, metallic or non-metallic, such as particles of lead. Such particles may be in the form of spheres or other shapes including finely divided powders. In the illustrated embodiment the particles are shown as lead spheres 20 having a diameter of less than one-quarter wavelength of the highest sonar frequency.

The lead spheres 20 in the illustrated embodiment are spaced from each other a distance equal to at least two diameters, and preferably by at least ten diameters. Other finely divided particles may be employed by dispersement within the middle layer 16.

When large particles, such as lead spheres are used, their maximum dimensions should be in the order of one-sixteenth of an inch to one-eighth of an inch. This size range is small enough to avoid interference with the transmission of sonar signals using sonar of conventional frequencies, and large enough to permit an adequate increase in the mass of the middle layer 16. The orderly positioning of the lead spheres 20 in respect to the middle layer 16 is achieved by patterning them at regulated spaced distances of several sphere diameters from each other. In other applications the particles may be of granular size and thoroughly distributed through the core.

The presence of the high mass 20 within the middle layer 16 presents a high impedance path to the shear wave of a vibration mode, but a low impedance path, due to the discrete spacing of the particles, to the compression wave of a sonar signal.

By forming the middle layer 16 of a relatively visco-elastic damping material when compared with the outer layers 14 and 18, the added damping effect achieved by this type of construction will be conferred upon the self-damping material of the present invention.

In respect to varying the visco-elasticity of the middle layer 16, namely the relative "softness" of the middle layer 16 to the outer layers 14 and 18 in terms of acoustic transmission, a variety of techniques are available. For example, the relative stiffness and flexibility in terms of acoustic transmission of the middle layer 16 may be varied by the use of different resins, as by using one type of resin in the outer layers 14 and 18, and another type of resin which forms a relatively visco-elastic damping material in the middle layer 16. Alternatively, relative visco-elastic damping properties may be achieved by varying the types and/or amounts of reinforcement, as for example, the use of different discrete types of glass fabric, or glass fabric versus glass mat, or glass fabric versus nylon fabric.

The layers 14, 16, and 18 should preferably comprise a reinforced plastic because of the relatively excellent acoustic impedance matching between reinforced plastics and water. The reinforcement for the plastic may be a glass fiber, such as a glass fabric or a glass mat, or another suitable reinforcement material having similar reinforcement properties to glass in terms of strength and durability in the laminated plastic art, such as nylon.

Reinforced plastics of the aforesaid type possess excellent acoustic impedance matching characteristics to water enabling excellent acoustic matching to be achieved between the water within the dome and the water outside the dome.

As illustrative of the self-damping materials of the present invention the following examples are submitted which are deemed sufficient to acquaint one having skill in the art with the mode of manufacture of the subject invention:

The plastics which were used were Glidpol 1001A and Glidpol 2002. Glidpol 1001A and Glidpol 2002 are thermosetting resins formed from a dihydric alcohol and terephthalic acid, and may be obtained from the Glidden Co., 11001 Madison Avenue, Cleveland 2, Ohio. Glidpol 1001A is a rigid polyester resin which when blended with various amounts of Glidpol 2002 flexible resin allows intermediate degrees of flexibility.

A mixture of 90 parts of Glidpol 1001A and 10 parts of Glidpol 2002 were catalyzed with 1% of methyl ethyl ketone peroxide. This material was thoroughly impregnated into fourteen plies of 1000 Volan A glass fabric. The 1000 Volan A glass fabric comprises a glass fabric which is coated with a bonding agent comprising a Werner type complex of chromium, namely methacrylato chromic chloride in isopropanol. This was vacuum barrier molded at 160° F. using a polyvinyl alcohol barrier to produce a laminate. Upon cure of this laminate, the polyvinyl alcohol barrier was removed, and the upper ply of the fourteen ply laminate was similarly removed. A mixture consisting of 50 parts of Glidpol 1001A and 50 parts of Glidpol 2002 was catalyzed with 1% of methyl ethyl ketone peroxide. To this mixture was added 50 parts of finely divided lead particles. Fourteen plies of 1000 Volan glass fabric were thoroughly saturated with this mix while on top of the 90/10 laminate described above. These fourteen plies were then vacuum barrier molded at 160° F. on top of the first thirteen ply laminate. The curing operation bonds the laminates. Upon cure, the vacuum barrier was removed as was the topmost ply of the fabric. This now leaves a twenty-six ply laminate consisting of two sections, thirteen plies each, one section of which is composed of a 90/10 mixture, and the other section of which is composed of a 50/50 mixture. A mixture was then prepared consisting of 90 parts of Glidpol 1001A and 10 parts of Glidpol 2002 and catalyzed with 1% of methyl ethyl ketone peroxide. Thirteen plies of 1000 Volan glass fabric were thoroughly saturated with this mixture while on top of the twenty-six ply laminate described above. This was then vacuum barrier molded at 160° F. The vacuum barrier was removed leaving a laminate of thirty-nine plies, the outer thirteen plies of which on both faces consisting of 90/10 mix, and the inner thirteen plies consisting of 50/50 mix. This is now considered to be a laminar laminate.

Thus, the finely divided particles are dispersed in the middle layer in such manner that they are uniformly distributed through the middle layer, as by efficient blending of such fine high density particles with the material forming the middle layer prior to the formation of the middle layer.

While the self-damping materials of the present invention have prime utility in sonar domes, they may be used in many applications where the damping of shear wave forces is desirable, as on the trailing edges of high performance aircraft and missiles.

A wide variety of plastics, a wide variety of reinforcement materials, and a wide variety of metal particles may be used in the subject invention. As above-indicated, the middle layer may be relatively highly visco-elastic in respect to the outer layers, or may have the same acoustical section as the outer layers.

The self-damping materials of the present invention possess both superior self-damping characteristics and good strength characteristics.

The present invention may be embodied in other specific forms without departing from the spirit or essential attributes thereof and, accordingly, reference should be made to the appended claims, rather than to the foregoing specification as indicating the scope of the invention.

By "acoustically identical in section" as used in the following claims is meant the identical ability to transmit mechanical vibration.

We claim:

1. A self damping material formed of three layers of plastic material, with each of the outer layers being acoustically identical in section, with the center layer having a relatively high mass per unit volume compared to each of the outer layers, said center layer being formed of a more visco-elastic material than each of the outer layers, and with said center layer comprising particles of high density retained in a predetermined spaced disposition in respect to each other.

2. A self damping material in accordance with claim 1 in which the high density particles are formed of metal.

3. A self damping material in accordance with claim 1 in which each of the high density particles is spaced from the remainder of the high density particles by a distance equal to at least two times the maximum dimension of such high density particles.

4. A self damping material in accordance with claim 1 in which each of the high density particles is spaced from the remainder of the high density particles by a distance equal to at least ten times the maximum dimension of such high density particles.

5. A self damping material in accordance with claim 1 in which each of the three layers of plastic material is formed from laminated reinforced plastic.

6. In a sonar dome, an acoustic window through which the compression waves of a sonar signal may be passed, said acoustic window being formed of the self damping material of claim 1.

7. A sonar dome in accordance with claim 6 in which the stiffness of the center layer is sufficient so that the entire structure of the dome partakes of the same flexural vibration.

8. A sonar dome in accordance with claim 6 in which the combined thickness of the three layers is appreciably less than the shortest critical wavelength of the sound waves transmitted through the dome.

9. A sonar dome in accordance with claim 6 in which the high density particles have a maximum dimension which is less than one-fourth of the wavelength of the highest frequency sonar signal transmitted through the acoustic window.

10. A sonar dome in accordance with claim 6 in which the size of the high density particles is less than that which appreciably interferes with the transmission of compression wave sonar signals, but which is sufficient to produce an appreciable increase in the mass of the central layer.

References Cited in the file of this patent

UNITED STATES PATENTS

| | | |
|---|---|---|
| 1,947,788 | McIntyre | Feb. 20, 1934 |
| 2,068,533 | Coffman | Jan. 19, 1937 |
| 2,184,139 | Cunnington | Dec. 19, 1939 |
| 2,434,666 | Mason | Jan. 20, 1948 |
| 2,659,884 | McMillan et al. | Nov. 17, 1953 |
| 2,672,945 | Harris et al. | Mar. 23, 1954 |
| 2,806,509 | Bozzacco et al. | Sept. 17, 1957 |
| 2,956,281 | McMillan et al. | Oct. 11, 1960 |